Figure 1:
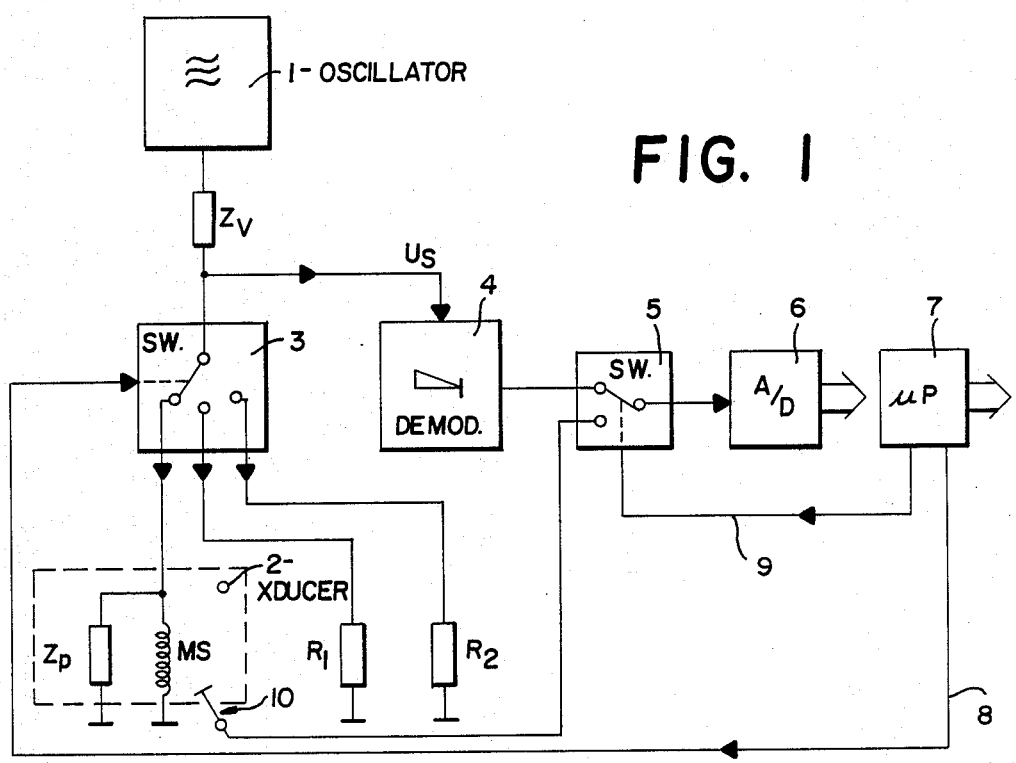

United States Patent [19]

Hrubes

[11] Patent Number: 4,847,794

[45] Date of Patent: Jul. 11, 1989

[54] ERROR COMPENSATION METHOD FOR TRANSDUCERS HAVING NON-LINEAR CHARACTERISTICS, AND AN ASSEMBLY FOR CARRYING OUT SAID METHOD

[75] Inventor: Franz Hrubes, Rotthalmünster, Fed. Rep. of Germany

[73] Assignee: Micro-Epsilon Messtechnik GmbH & Co. KG, Fed. Rep. of Germany

[21] Appl. No.: 900,691

[22] Filed: Aug. 27, 1986

[30] Foreign Application Priority Data

Aug. 30, 1985 [DE] Fed. Rep. of Germany ....... 3531118

[51] Int. Cl.$^4$ .......................... G01C 25/00; G01F 1/86; G01K 7/00
[52] U.S. Cl. ................................. 364/571.04; 73/1 R; 73/861.03; 73/708; 73/765; 374/172
[58] Field of Search ............... 364/508, 509, 550, 551, 364/558, 571, 178, 179; 73/304 C, 1 R, 3, 4 R, 765, 768, 708, 861.01, 861.02, 861.03; 374/172

[56] References Cited

U.S. PATENT DOCUMENTS

| | | | |
|---|---|---|---|
| 3,975,727 | 8/1976 | Mader et al. ..................... | 73/1 R X |
| 4,072,051 | 2/1978 | Peterson ........................... | 73/861.03 |
| 4,093,871 | 6/1978 | Plumb et al. .................. | 73/861.03 X |
| 4,192,005 | 3/1980 | Kurtz ................................ | 73/765 X |
| 4,253,155 | 2/1981 | Freiday et al. ................. | 364/573 X |
| 4,399,515 | 8/1983 | Gross ................................... | 364/571 |
| 4,481,596 | 11/1984 | Townzen ........................... | 364/571 |
| 4,532,601 | 7/1985 | Lenderking ....................... | 364/571 |
| 4,618,940 | 10/1986 | Schmitt ............................ | 73/1 R X |
| 4,644,482 | 2/1987 | Juanarena ......................... | 364/558 |
| 4,672,566 | 6/1987 | Asano et al. ...................... | 364/571 |

Primary Examiner—P. S. Lall
Assistant Examiner—Joseph L. Dixon
Attorney, Agent, or Firm—Bacon & Thomas

[57] ABSTRACT

A method of error compensation for transducers having non-linear characteristics is shown. A computer-supported measuring circuit is used. In a first factory alignment, the output characteristic of the transducer is set so that it can be linearized by the computer using a power function. The appropriate exponent of the power function is stored. At the place of use, at least three calibration measurements are performed with the installed transducer using defined calibration measured values substantially spanning the measuring range of the transducer equidistantly. The power function is solved with the calibration measuring results and the stored exponent, so that the constants not yet known can be calculated. During every following service measurement, the actual measuring result is put into the now solved power function. The result of the equation is then outputted as the error-compensated measuring result.

10 Claims, 1 Drawing Sheet

ERROR COMPENSATION METHOD FOR TRANSDUCERS HAVING NON-LINEAR CHARACTERISTICS, AND AN ASSEMBLY FOR CARRYING OUT SAID METHOD

The present invention relates to an error compensation method for transducers having non-linear characteristics, and to an assembly for carrying out said method.

Measuring technology requires the output value of a transducer to be linearly proportional to the value to be measured. If this is not the case, compensation circuits are provided for linearizing the characteristic of the transducer. Such compensation circuits are, for example, diode networks, with which the non-linear characteristic is reproduced as a draft of traverse with inverted curvature in such a way that the non-linear input signal of the diode network appears at the output as a linear signal. In a different embodiment of such a linearizing or compensating circuit, the output signal of the transducer is multiplied by a logarithmic characteristic of a following circuit and thereby linearized. Both methods are disadvantageous in that linearization can only be performed with enormous alignment efforts, and furthermore the alignment must be performed by a trained person. Also, the abovementioned known methods only allow for very limited compensation, so that an unavoidable measuring error is left over which is intolerably great in many cases.

In addition to the above-mentioned disadvantages, the circuits for compensating the non-linear characteristics themselves involve an additional zero drift and an additional temperature drift. These additional "disturbances" must be compensated in further circuits.

In particular when the transducer is used industrially, sufficiently trained staff is usually not available for carrying these alignment measures. The measuring equipment producer's maintenance staff must then perform the adjustment, which is known to entail very high costs. As soon as the transducer is installed in a different apparatus for a new measuring purpose or must be replaced due to damage, the whole alignment procedure starts all over again.

Assuming the above-mentioned prior art, the present invention is thus based on the problem of showing a method by which the unavoidable measuring error is smaller than up to now, and which is nevertheless easy to carry out.

This problem is solved using a computer-supported measuring circuit by adjusting, in a step a, during a first factory alignment of the measuring circuit, the output characteristic of the transducer so as to allow for linearization which is as accurate as possible by means of the the computer with reference to a power function of the basic equation $$Y = A + B \left( \frac{1}{X + W} \right)^D \quad \text{(Equation G)}$$

wherein Y corresponds to the linearized signal and X to the non-linear measured value. For this purpose, the measuring circuit is expediently aligned in such a way that the characteristic of the transducer varies uniformly continuously and, in order to obtain a good signal/noise ratio, considerably over the measuring range. The value D typical of this characteristic is determined once and fixed for the corresponding transducer. The values A, B and W are expediently determined by an equation system having three equations (regression method) and an additional iteration method in such a way that the three intersecting points of the output characteristic and the linearization characteristic are located at the beginning, in the middle and at the end of the measuring range. The values A, B and W may deviate from the factory-determined values at the actual place of measurement due to ambient influences and different materials of the test objects. Therefore, in a step b at the place of use, at least three calibration measurements are performed with the installed transducer using defined calibration measured values that substantially span the measuring range equidistantly. In a step c the equation (G) is solved with the calibration measuring results and the stored constant D to determine the constants A, B and W, and the constants A, B and W are stored. In a step d, during every subsequent service measurement, the actual measuring result is put in as the X value and the corresponding Y value outputted as the error-compensated measuring result.

Use of the above-mentioned compensation equation (G) results in a particularly small deviation of the characteristic from the desired linear shape since this function has a shape which can basically be curved at will by varying very few parameters in wide ranges. This presupposes, of course, that the shape of the characteristic of the transducer is uniformly continuous, but this condition can be met by all transducers at least within ranges.

The curvature of the characteristic, which is expressed in the exponent D of Equation (G), is generally typical of the transducers. This applies in particular to transducers which, according to the eddy current principle, measure the distance between a conductive surface and a measuring coil disposed in an oscillating circuit. In this case, the exponent D is typical of a specific structural shape of the transducer, so that the exponent D need only be determined once (e.g. by curve fitting) for a certain type of transducer. This value corresponding to the transducer can then be inputted to the computer when the transducer is used.

The transducer is then installed at the place of use and calibration measurements are performed using defined calibration measured values, whereby, for example, the minimum distance, the maximum distance and the average distance (in the case of a distance transducer) are each set by means of a caliber. Equation (G) can then be solved for A, B and W with these three measured values and the known constant D, so as to obtain the values A, B and W. This process is also carried out by the computer.

The values A, B and W are stored.

During every subsequent measurement, the output value of the transducer, which has a non-linear relationship to the actual measured value, can then be corrected with reference to Equation (G), so as to obtain the error-compensated value. This way of compensating errors ensures that linearization of error correction itself does not involve any further errors, as is always the case due to drift phenomena when diode networks, etc., are used.

Further, the inventive method, in which linearization can also be carried out by a non-expert in few steps, allows for the transducer to be used for a different purpose in a different place without much effort, and to be corrected again in accordance with the surroundings, which generally in turn have an effect on the characteristic of the transducer. Extensive adjustment measures as required by diode networks, etc., which can only be performed by an expert, are thus not necessary.

A preferred embodiment of the inventive method is characterized by the fact that in a further step, after determining the constants A, B and W or after storing these constants, a plurality of solution points of Equation (G) are stored in successive memory addresses and during each subsequent measurement the actual measuring result is assigned to the closest stored value and the memory address outputted as a value proportional to the value X. Since the equation need not be solved for each measured value put in, which requires a certain computing time, it is possible to considerably increase the measuring frequency which can be achieved. The computer must merely digitize the measured value, round it off and look for the memory address corresponding to the measured value. The contents of the memory address then state the error-compensated measured value or a value proportional thereto.

The measuring range is preferably only subdivided relatively roughly in the above-mentioned method, whereby the compensated value is interpolated between two stored points in accordance with the position of the actual measured value. Such an interpolation process requires only little computing time but the resolution of the measuring system is considerably increased without requiring too much storage location.

If the measured value is fed by a source such as the above-mentioned eddy current transducer, the problem arises that the source output also shows fluctuations, e.g. a long-time drift or a temperature drift. These errors are continued via the transducer through the entire measuring system and falsify the measuring result additionally. Preferably, the method is modified in this case in such a way that, after storing the constants A and B or after storing the points of Equation (G), two different calibration impedors are coupled successively instead of the transducer to the measuring circuit, said impedors being such that the measuring results are substantially in the marginal zones of the measuring range when the measuring impedors are coupled. The two calibration impedor measured values are stored and the two calibration impedors are coupled between individual service measurements during the service measurements proper, the resulting calibration impedor measured values are compared with the stored calibration measured values, and either the stored values A, B and W of the entire measuring assembly are corrected with reference to the comparison by solving Equation (G) anew for each measured value, or—preferably—the stored solution points are corrected by calculating the measured values back to the curve originally determined during the calibration process, i.e. balancing zero point and proportionality changes, so that the values A, B and W can be retained. Thus, by joining up the calibration impedor, which is very stable in terms of temperature and long duration and is still available inexpensively, one obtains an alignment of the entire system including the source with respect to the zero point and the gain factor.

The fact that the characteristics of the transducers are temperature-dependent in many cases is taken into account in a further preferred embodiment of the method in that the temperature variation of the output characteristic is determined at the factory and stored at least pointwise. During the service measurements the actual temperature of the transducer is then detected, whereupon the outputted measuring result is corrected with reference to the result and the stored temperature characteristic points. The temperature variation is again typical of the type of transducer so that the temperature variation also need only be determined once at the factory and can then be fed to the computer at the place of use depending on the transducer used. Depending on how the characteristic varies with the temperature, it suffices to store factors of proportionality, i.e. the measuring result is only multiplied by a factor, or a corresponding number of points is stored if the temperature has a non-linear relationship to the measured value. With reference to these stored points, the measuring result is then multiplied, depending on the measured value, by factors which are corresponding but different to each other. One advantageously interpolates again between the various points.

Since the temperature usually only changes relatively slowly, a further preferred embodiment of the invention involves the actual temperature being sensed relatively seldom and the set of solution points of Equation (G) then being corrected accordingly if the instantaneous temperature has changed to a substantial extent with respect to the temperature detected at the last measurement.

Using this method, in which the temperature variation of the transducer is also compensated or the resulting measuring error compensated, it is possible to further increase the long-time stability of the measuring system considerably. In this case, the temperature fluctuations that normally occur if only due to the day-/night cycle, or their influence on the measuring result, are eliminated.

As in the case of temperature measurement or compensation, it is of course also possible to join up the compensation resistances relatively seldom since the zero point and gain also change relatively slowly. The compensation calculation (in the computer) is preferably performed in the background during service measurement.

The computer of microprocessor suitable for carrying out the method described in the first two claims is one equipped in the usual fashion which can acquire measured values via a digitizer. In any case, however, the computing speed must be so high that only a sufficiently short period passes from the time a measured value is taken up and the time it is reproduced. Otherwise, a measuring frequency meeting the usual requirements cannot be obtained using the inventive method.

An apparatus for carrying out the method in which calibration impedors are coupled to the measuring circuit has an electrically controllable change-over switch for selectively connecting a first pole with second to fourth poles to which the transducer or the calibration impedors are connected, an impedor between the oscillator and the first pole of the change-over switch, a demodulator whose input is connected to the first pole of the change-over switch and whose output is connected at least intermittently with a digitizer, and a microprocessor whose data input interface is connected to the digitizer and which has at least one control signal output line which is connected to the control input of the change-over switch. The term "demodulator" also refers here to an amplifier if the signal of the transducer is a processible signal, e.g. a D.C. signal.

This apparatus makes it possible in a particularly simple way to detect the feeding amplitude of the source or also compensate its changes, at the same time compensating the zero drift and gain drift of the entire electronic system. In this way it is possible to design the demodulator or else the digitizer relatively simple without temperature drift or long-time drift compensation, since these errors are automatically compensated as well. It is only necessary to give the calibration impedor and the impedor between the source and the change-over switch a stable design.

A further advantage of the above-described assembly is that a change in the load on the source for feeding the transducer is also compensated. Such a change occurs, for example, when several transducers are fed by a single source. With the linearization networks known up to now, the source had to be accordingly readjusted back to the predetermined value corresponding to the linearization characteristic. This is not necessary with the present invention. Instead, the present invention allows for the use of a very simple source—in the case of the eddy current transducer, a simple quartz oscillator in CMOS logic with a following low-pass filter and transistor buffer stage—since the linearized voltage remains constant in spite of changes in the source signal or oscillator signal.

There is also the advantage that influences of the supply lines, which must be designed very elaborately in the case of conventional high-precision transducers, can also be left out of consideration.

In the following, a preferred embodiment of the inventive apparatus shall be described in more detail with reference to figures. These show:

FIG. 1 a block diagram of a preferred embodiment of the invention, and

Figure 2:
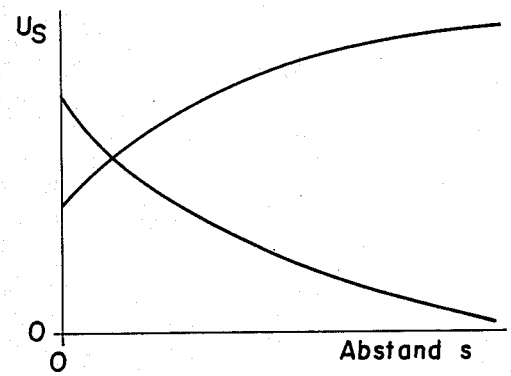

FIG. 2 typical non-linear characteristics

FIG. 1 shows an assembly for compensating the non-linear input/output characteristic of an eddy current transducer 2.

As can be seen in FIG. 1, a source 1, an oscillator, is connected via an impedor $Z_v$ with one pole of an electrically controllable change-over switch 3. Change-over switch 3 can connect one pole of impedor $Z_v$ optionally to one of three output poles. One of the output poles is connected to eddy current transducer 2, whose equivalent circuit diagram can be described by the parallel circuit of an impedor $Z_p$ and an inductance coil MS. The two other output poles of change-over switch 3 are connected with resistors $R_1$ and $R_2$ which are in turn grounded with their other poles, as is transducer 2. It is expedient for $Z_v$, MS and $Z_p$ to be selected such that the measuring signal varies significantly and uniformly continuously over the measuring range.

Measuring signal $U_s$ is picked up between impedor $Z_v$ and change-over switch 3, and directed to the input of a demodulator 4. The output of demodulator 4 is connected at least intermittently via a further change-over switch 5 with a digitizer 6 which digitizes the demodulated values and transfers them to microprocessor 7.

Change-over switch 5 at the input of digitizer 6 switches this input back and forth between the output of demodulator 4 and the output of a temperature sensor 10 which senses the temperature at transducer 2. Connecting line 9 between microprocessor 7 and change-over switch 5 serves to control the change-over.

From microprocessor 7 a further control line 8 leads to change-over switch 3, so that microprocessor 7 can control the connection of the source (via impedor $Z_v$) with transducer 2, resistor $R_1$ or resistor $R_2$.

Transducer 2, which is shown here in the form of an eddy-current transducer, can also be replaced by any other transducers which must be fed by a source. Such transducers may have non-linear characteristics, as shown in FIG. 2, i.e. characteristics with any curvature, as long as it is uniformly continuous.

The apparatus is operated as follows.

First, the output characteristic of the transducer is determined in a first factory alignment by means of the computer, by taking up the characteristic with discrete measuring points. Then, a power function of the basic equation $$Y = A + B \left( \frac{1}{X + W} \right)^D \tag{G}$$

is fitted onto the determined characteristic by means of computer 7 (or a different computer), wherein X corresponds to the output signal of the transducer and Y to the measured value. A, B, W and D are constants.

Constant D is stored or printed out so that it can be provided with every transducer of this type, e.g. as a numerical value.

At the place of use, at least three calibration measurements are performed with installed transducer 2 using defined calibration measured values (e.g. distances), one value being at the lower limit, one at the upper limit and one in the middle of the measuring range.

Equation (G) is then solved by computer 7 and setting the calibration measuring results and constant D, and constants A, B and W are determined therefrom. Constants A, B and W are stored in computer 7. After these preparations, the measuring system is ready for service measurements. The actual measuring result can then be put into the equation as the X value (in the computer) and the corresponding Y value outputted as the error-compensated measuring result. A multiplication factor is of course provided so that an output value (optionally an output voltage via a D-A converter) of 1 (or 1 volt), for example, corresponds to a measured distance of 1 mm.

Preferably, however, a plurality of solution points of Equation (G) are stored in the computer after determining constants A and B, and only the corrected measured values corresponding to the measured value are searched in the memory during the service measurements, these values being outputted (after interpolation, if required).

The apparatus shown in FIG. 1 also makes it possible to couple the two different calibration impedors $R_1$ and $R_2$ instead of transducer 2 (not necessarily directly) successively to the measuring circuit between individual measurements, calibration impedors $R_1$ and $R_2$ being such that they correspond to the impedance of transducer 2 at the limits of its measuring range. The calibration impedor measured values are then stored in microprocessor 7. During the service measurements the calibration impedor is repeatedly coupled instead of transducer 2 to demodulator 4 by means of switch 3 controlled via line 8 of microprocessor 7, and the measuring results are compared with the stored calibration impedor measured values. Correction values can then be calculated from the result of the comparison for compensating a zero shift which might have occurred in the meantime or change in the factor of proportionality. Either these correction values are then added on to each individual measuring result or the stored solution points of Equation (G) are corrected in computer 7.

If the temperature variation of transducer 2 was already determined in the factory, temperature compensation can be performed with the apparatus shown in FIG. 1. For this purpose, microprocessor 7 switches change-over switch 5 repeatedly onto temperature sensor 10 so that a signal proportional to the temperature of transducer 2 reaches digitizer 6 and microprocessor 7. The measuring result to be outputted is then corrected with reference to the points of the temperature variation of the output characteristic stored in microprocessor 7. Microprocessor 7 preferably drives switch 5 via control line 9 relatively seldom and always performs a correction of the stored solution points of Equation (G) when the value measured instantaneously by the temperature sensor deviates to a substantial extent from that detected at the previous temperature measurement.

I claim:

1. An error compensation method for transducers having non-linear characteristics, comprising the steps of:
   (a) reproducing the output characteristic of a transducer, said output characteristic having the form of a power function of the basic equation $$Y = A + B \left( \frac{1}{X + W} \right)^D \quad (G)$$

wherein X corresponds to an output signal of the transducer; Y corresponds to a compensated conversion of X; and A, B, W and D are constants, D corresponding to the graphical curvature of the output characteristic;
   (b) determining D from the output characteristic;
   (c) establishing a compensation characteristic having at least three points in common with said output characteristic;
   (d) performing at least three calibration measurements at the measurement site using the transducer to derive at least three X values and at least three Y values;
   (e) determining A, B and W from equation G using the at least three calibration measurements and D;
   (f) storing A, B and W; and
   (g) determining a compensated Y for each measured X using equation G.

2. An error compensation method as claimed in claim 1, further comprising the step, following (f), of:
   (f') establishing a plurality of solution points (X, Y) of equation G wherein said compensated Y determined in step (g) is determined by assigning the measured X to the closest established solution point (X, Y).

3. An error compensation method as claimed in claim 2, wherein said determination by assignment in step (f') is carried out by interpolation between two of said solution points.

4. An error compensation method as claimed in claim 3, further comprising the step, following step (f'), of successively coupling in parallel two different calibration impedors instead of the transducer to the measuring circuit, which are such that the measuring results, when either measuring impedor is coupled, are substantially in the marginal zones of the measuring range, storing the two calibration impedor measured values and, in step (g) between measurement site Y determinations, successively coupling the two calibration impedors, comparing the obtained calibration impedor measured values with the stored calibration impedor measured values and compensating the stored constants A and B or the zero point and factor of proportionality of the entire measuring circuit with reference to the comparison.

5. An error compensation method as claimed in claim 2, further comprising the step, following step (f), of successively coupling in parallel two different calibration impedors instead of the transducer to the measuring circuit, which are such that the measuring results, when either measuring impedor is coupled, are substantially in marginal zones of the measuring range, storing the two calibration impedor measured values and, in step (g) between measurement site Y determinations, successively coupling the two calibration impedors, comparing the obtained calibration impedor measured values with the stored calibration impedor measured values and compensating the stored constants A and B or the zero point and factor of proportionality of the entire measuring circuit with reference to the comparison.

6. An error compensation method as claimed in claim 5, wherein the stored solution points are corrected as a function of the calibration impedor measured values.

7. An error compensation method as claimed in claim 5, wherein in step (a) the temperature variation of the output characteristic is determined and stored at least pointwise and in step (g) the actual temperature of the transducer is detected and the outputted measuring result corrected with reference to the result and the stored temperature/characteristic points.

8. An error compensation method as claimed in claim 2, wherein the stored solution points are corrected as a function of predetermined temperature/characteristic points.

9. An error compensation apparatus for transducers comprising:
   a transducer;
   at least two impedors;
   an oscillator;
   a digitizer;
   a first electrically controllable changeover switch having at least four poles for selectively electrically connecting a first pole with second, third and fourth poles to which the transducer and the at least two impedors are electrically connected;
   a third impedor having first and second terminals, said first terminal electrically connected to said first pole, and said second terminal electrically connected to said oscillator;
   a demodulator having an input electrically connected to the first pole and an output electrically connected at least intermittently to the digitizer; and
   a microprocessor having a data input interface electrically connected to the digitizer, said microprocessor having at least one control signal line electrically connected to a control input of the first changeover switch whereby said microprocessor is arranged to compensate for errors in data input to said data input interface.

10. An error compensating apparatus for transducers as claimed in claim 9, further comprising:
    a temperature sensor; and
    a second electrically controllable changeover switch electrically connecting the digitizer selectively with the demodulator or the temperature sensor in response to a control signal transmitted on said control signal line of the microprocessor.

* * * * *